(12) United States Patent
Smith

(10) Patent No.: US 9,320,267 B2
(45) Date of Patent: Apr. 26, 2016

(54) TERMINAL TACKLE HOLDER

(71) Applicant: Wayne Tracy Smith, Auckland (NZ)

(72) Inventor: Wayne Tracy Smith, Auckland (NZ)

(*) Notice: Subject to any disclaimer, the term of this patent is extended or adjusted under 35 U.S.C. 154(b) by 219 days.

(21) Appl. No.: 13/966,287

(22) Filed: Aug. 14, 2013

(65) Prior Publication Data

US 2015/0047249 A1 Feb. 19, 2015

(51) Int. Cl.
*A01K 97/06* (2006.01)

(52) U.S. Cl.
CPC .................................. *A01K 97/06* (2013.01)

(58) Field of Classification Search
CPC ........................................................ A01K 97/06
USPC ................................................. 43/57.1, 57.2
See application file for complete search history.

(56) References Cited

U.S. PATENT DOCUMENTS

| | | | | |
|---|---|---|---|---|
| 485,582 A * | 11/1892 | Howe | | 43/57.1 |
| 891,055 A | 2/1908 | Frost | | |
| 2,041,231 A * | 5/1936 | Collins | | 43/57.2 |
| 2,497,188 A * | 2/1950 | Schindler | | 43/57.1 |
| 2,638,699 A * | 5/1953 | Seeburg | | 43/57.2 |
| 3,507,071 A * | 4/1970 | Bryson | | 43/57.1 |
| 3,564,755 A * | 2/1971 | Lindgren, Sr. | | 43/57.2 |
| 4,176,491 A | 12/1979 | Herring | | |
| 4,240,222 A * | 12/1980 | Covington | | 43/57.1 |
| 4,248,004 A | 2/1981 | Trotter | | |
| 4,281,470 A * | 8/1981 | Anderson | | 43/57.1 |
| 4,514,928 A * | 5/1985 | Hanson | | 43/57.2 |
| 4,631,856 A * | 12/1986 | Born | | 43/57.1 |
| 4,924,621 A * | 5/1990 | Hawranik et al. | | 43/57.2 |
| 5,357,707 A * | 10/1994 | Lewis | | 43/57.2 |
| 5,386,662 A * | 2/1995 | Vader et al. | | 43/57.2 |
| 6,079,148 A * | 6/2000 | Yonenoi | | 43/57.1 |
| 2010/0170139 A1 * | 7/2010 | Zhou | | 43/54.1 |

* cited by examiner

*Primary Examiner* — Darren W Ark
*Assistant Examiner* — Danielle Clerkley

(57) ABSTRACT

The present invention provides a personal double-sided terminal tackle holder for anglers that releasably retains a plurality of fishing hooks, artificial flies, lures and pre tied leader rigs which is generally carried in an angler's pocket or attached to an item of clothing, fishing vest or gear. The holder includes a generally flat rectangular base made of resilient materials where artificial flies and rigs are held by being slotted into or embedded into the base. The base has two exposed elongated ribs protruding outwards from both sides of the base, located towards both outer ends of the base. The ribs protect the tackle from being damaged or accidently dislodged from the device.

7 Claims, 3 Drawing Sheets

TERMINAL TACKLE HOLDER

BACKGROUND OF THE INVENTION

1. Field of Invention

The present invention relates generally to an anglers artificial fly and pre-rigged leader holder, used by a person while fishing.

Particularly to a personal double-sided terminal tackle holder which is generally carried in an angler's pocket or attached to an item of clothing, fishing vest or gear. Releasably retaining a plurality of fishing hooks, artificial flies, lures and rigs securely while keeping the items highly accessible yet protected from loss or damage.

The apparatus is mostly comprised of a generally flat rectangular base made of lightweight cushioned, and resilient materials that has four exposed elongated ribs protruding outwards from the base faces and located towards both outer ends of the base. The hooks, artificial flies and rigs are releasably held by being slotted into, or embedded into the base material and where the fishing line portion of the rigs is wrapped around the base between the ribs. The terminal tackle is protected from being damaged or accidently dislodged from the device by the protruding ribs.

The holder is practical, easily carried and simple to use. Items are held securely and protected yet are easily accessible.

2. Background of the Invention

While fishing, anglers, especially fly fisherman find it advantageous to carry artificial flies exposed and easily accessible on their person; usually embedded on a patch of foam or wool worn on a fly vest or clothing, or even embedded in their hat. The disadvantage with the existing methods is that the flies can be damaged or become easily dislodged and lost while fishing. Many anglers also pre-tie and carry multiple pre-tied rigs that consist of line with terminal tackle, which can include flies, hooks, swivels, lures and sinkers. These pre tied rigs easily become entangle when grouped together, especially where the rigs are comprised of dual or multi pre-tied lines, which may have two or more hooks, lure and/or sinker combinations. It's common practice to change from one pre tied rig for another while fishing and where to store these rigs has always been a problem. Up until now there hasn't been an adequate device that both stores and protects the replaced rigs without having to use a folder or enclosed box. The ribs act a barrier keeping the tackle from being knocked or rubbed off the device while at the same time keeping it secure, exposed and easily accessible.

The object of the present invention is to provide a simple and ergonomic fishing hook, artificial fly and pre-rigged leader holder that overcomes the disadvantages referred to above.

3. Prior Art

Hook, artificial fly and rig holders are commonly found in tackle shops and there's know art on various forms of these devices, some of which are similar in construction to the present invention; of these most are some forms of fly patches or EVA foam Sabiki rig (a universal and common multi hook fishing rig) holders. Even though these products and art have something in common with the present invention, all will be shown to be significantly different in design and construction.

All known prior art lacks at least one of the following claims of the present invention. The present invention has been adapted to a personal wearable and pocket able device for securement of fishing hooks, artificial flies and pre-rigged leaders, including: 1) a double-sided terminal tackle holder including a generally flat base with first and second faces; 2) a base comprised of cushioned and resilient material such as EVA foam; 3) the base including a means to receive and releasably hold terminal tackle (e.g. fishing hooks), wherein fishing hooks are insertable in cutouts with slit/cuts within both sides of the said base. 4) the base including four ribs, two ribs attached to each face of the base, the ribs being parallel to each other and located near two opposing sides of the base face respectively; 5) the ribs being arranged substantially apart of one another on the base faces where terminal tackle is secured in the area of the base between the two ribs; 6) the base is further comprised where all ribs are oriented in the same direction, there are no perpendicular orientated exposed ribs on the base faces; 7) the base is further comprised where the space between the two respectively located ribs is clear and open; 8) the ribs are arranged on the base face wherein they allow for a multiplicity of hooks to occupy the space between the respectively located ribs without having to come into contact with the ribs.

With specific reference to the following patents:
U.S. Pat. No. 4,248,004; U.S. Pat. No. 4,924,621; U.S. Pat. No. 4,176,491 A.

(a) U.S. Pat. No. 4,248,004 represents a holder for fishing rigs, the general object of the invention being to provide a means for holding fishing rigs having multiple leaders. In general this invention strives to solve the same problem as the present invention but differs in design and construction. The main difference being that it represents a device with multiple hinged panels that hold the rigs. The present invention comprises: 1) a double sides terminal tackle holder where a single base member is made of cushioned and resilient materials, and fishing hooks are insertable in cutouts with slit/cuts within both sides of the said base; 2) the base comprises of two spaced apart, generally parallel, elongated ribs that extend outward from the two faces of the said base, one rib each located in proximity to two opposing sides of the said base faces, where all ribs are orientated in the same direction. The cited art does not.

(b) U.S. Pat. No. 4,924,621 represents another holder for fishing rigs, again the general object of the invention being to provide a means for holding fishing rigs having multiple leaders. And again this invention strives to solve the same problem as the present invention but differs in design and construction. It is generally made from a flat base with notches in combination with hook and loop materials to secure the rigs. The present invention is comprised where 1) the base comprises of two spaced apart, generally parallel, elongated ribs that extend outward from the two faces of the base, one rib each located in proximity to two opposing sides of the base faces, wherein all ribs are orientated in the same direction. 2) The base is made of cushioned and resilient materials, where fishing hooks are insertable in cutouts with slit/cuts within both sides of the said base. The cited art does not.

(c) U.S. Pat. No. 4,176,491 A represents "A structure for the storage transportation of artificial fly-type fishing lures, it's generally a "fly-box" which is a holder for artificial flies. This invention comprises "a container having a base and an upstanding side wall . . . " with a lid, where fishing hooks are secured to the invention using solid pegs_ Unlike the present invention which comprises: 1) A base single base made of cushioned and resilient materials, where fishing hooks are insertable in cutouts with slit/cuts within both sides of the base. 2) The base comprises of two spaced apart, generally parallel, exposed elongated ribs that extend outward from both faces of the said base member, one rib each located in proximity to two opposing sides of the said base member faces, wherein there are no perpendicular orientated rib, all ribs being orientated in the same direction. The cited art does not.

While the devices disclosed in the background art appear adequate for the purposes for which they have been specifically designed, they fail to provide a terminal tackle holder that allows the gear to be both easily accessible and protected. As a result of the shortcomings of the background art, there exists a need for a new and improved fishing hook, artificial fly and pre-rigged leader holder.

OBJECTS AND ADVANTAGES

In keeping with the principle of the present invention the fishing hook; artificial fly and pre-rigged leader holder is unique and technically different from other forms of terminal tackle holders.

The double-sided terminal tackle holder is uncomplicated in design, ergonomic, portable and easy to use. It can be worn on a lanyard from around an angler's neck, carried in a pocket, replace a standard fly patch, or worn attached to a fishing vest, articles of clothing or gear. It can also be placed in a tackle box, fishing creel or a boat or car's cubbyhole. The gear is held securely and protected while still being easily accessible. The terminal tackle is also easily attached to the device and easily removed. It's construct of materials that can stand up to the rigors of fishing and is easily maintained.

Therefore the primary objective of the present invention is to provide an apparatus for use by anglers that holds fishing hooks, artificial flies and pre-rigged leaders securely and protected while remaining highly accessible while fishing.

The terminal tackle retention apparatus in it simplest form is generally formed of a single body comprised of two main parts. The first is a generally flat rectangular base member comprised of cushioned and resilient materials where the hooks are insertable in slit/cuts and cutouts within the two faces of the base and where line is wrapped around the base. The second features are four exposed elongated ribs protruding out from the base at each end and on both sides of the base creating significant ridges, generally helping to contain and protecting the tackle from damage or dislodgement. Having ribs on both sides of the base allow both side of the device to be utilized, thusly holding more gear and allowing for more hook placement options when using multiple hook leaders. In the case where the holder is in a larger or more elongated form a third or even fourth row of ribs can be added in a parallel fashion to the center section of the base providing for-added protection for the terminal tackle.

The holder is generally formed of a body made of a rectangular sheet of semi rigid, cushioned and resilient material incorporating slit/cuts and cutouts within the two faces of the base to hold fishing hooks; and in some cases notches with slits/cuts are placed along two of the outside edges of the base without ribs to help secure line. Statically affixed to selected areas of the base, generally on both sides of the base, are exposed elongated ribs placed parallel to one another creating significant ridges. The ribs are generally made of rigid and durable materials such as formed plastic or hardened foam. Having the ribs made of rigid and durable material help to straighten the device and make it easier for it to slide it in and out of pockets.

The holder can be further formed with a attachment point should the angler want to wearer the holder on a lanyard or attach the holder to an article of clothing or gear using a ring, cord, or a cable reel retractor.

Accordingly, there is a need to provide an improved terminal tackle holder for anglers.

SUMMARY

It is therefore an object of the invention to provide a double-sided fishing hook, artificial fly and pre-rigged leader holder that holds terminal tackle securely and protected from loss or damage.

It's also an object of the invention to provide a holder where the terminal tackle is held exposed when in use and are both easily attached to and removed from the holder.

It's another object of the invention to provide a terminal tackle holder that is capable of holding multiple pieces of and of different types and sizes hooks, artificial flies, swivels, lures, line and small weights.

It's still another object of the invention to provide a terminal tackle holder that can be worn on a lanyard around the neck, carried in a pocket or fastened on any type of clothing and gear.

Another object of the invention is to provide a terminal tackle holder that replaces a standard fly patch.

It's also an object of the invention to provide a terminal tackle holder which can stand up to the rigors or fishing while being easy to clean and maintain.

In accordance with the above and the other objects of the present invention, which will be discussed in detail below, a personal double-sided terminal tackle holder is provided.

In the following embodiments the primary sections are interchangeable creating a new embodiment.

According to a first embodiment of the invention the double-sided terminal tackle holder in its simplest form is made from a dimensional base member which is a generally flat and generally rectangular piece of semi-rigid, cushioned and resilient material such as EVA foam; the base having two faces and four sides. The base is further formed of four exposed elongated ribs; both faces of the base having two ribs which are attached in a parallel relationship and located adjacent to two opposing sides of the base; the ribs are substantially separated from one another creating an open space between the ribs where the fishing line and hooks are secured; the ribs on both sides of the base are positioned in direct relation to each other, and all ribs run in the same direction. The ribs also extend substantially outward from the surface of the base creating significant ridges; the ribs are generally made of rigid and durable materials such as formed plastic. Another feature of the base are slit/cuts with cutouts formed within the open area of the base faces between the ribs; fishing hooks are insertable into slit/cuts and cutouts in order to secure them. Fishing line is secured to the base by wrapping the line around the base between the ribs.

According to a second embodiment of the invention, the ribs are formed from the base.

According to a third embodiment of the invention, the base material is sandwiched between the ribs.

According to a forth embodiment of the invention, the base material passes thru a cutout in the rib's side and/or is embedded within a cavity in the rib.

According to an fifth embodiment of the invention the base is further comprised of notches with slit/cuts in the sides of the base where fishing line wrapping around the base is guided into the slit/cut via the notch and is held by compression within the slits/cuts.

According to a sixth embodiment of the invention, again the base is made from a flat body member with ribs, wherein the ribs further comprise ends that protrude past and wrap around the edges of the base further protecting the terminal tackle.

According to a seventh embodiment of the invention, again the base is a generally flat with a ribs on each end, comprised of a elongated rectangular base and where an further pair of ribs, one rib located on each face of the body; the ribs are located in the center of the body and parallel to the end ribs, providing more protection for the terminal tackle.

According to an eight embodiment of the invention, the base having a elongated rectangular shape where ribs are placed lengthways along the sides of the base, and not at the top and bottom.

According to a ninth embodiment of the invention, the base further comprises one or more lengths of ridged material such as a steel rod or plastic bar, which is inserted into or attached to the base so that it runs the length of the base to stiffen it.

According to a tenth embodiment of the invention the base further comprises a flat piece of ridged and durable material such as a thin sheet of plastic, generally or in the same footprint of the base shape, which is sandwiched between two sheets of the resilient base material the base to stiffen it.

According to a eleventh embodiment of the invention the base, the ribs, or a combination of both are further comprised of a attachment point, enabling the invention to be secured to a person using such methods as a lanyard, cord, swivel, or a cable reel for examples.

Other objects and advantages of the present invention will become apparent to those skilled in the art upon reference to the following detailed description and appended claims, and upon reference to the accompanying drawings.

DRAWINGS

Figures

In the drawings, closely related figures have the same number but different alphabetic suffixes.

FIG. 1 is a perspective view, illustrating the terminal tackle holder with artificial flies inserted into the holder using round cutouts with slit/cuts which are located in the holders base between the ribs; further illustrating how the fishing line connecting the two artificial flies is wrapped around it's base.

FIG. 2A is a front perspective view of a preferred embodiment of the present invention. Illustrating the general shape of the invention and its two main parts, the base and the four ribs. Further illustrating triangular tackle attachment cutouts with slit/cuts in the base and the top attachment point.

DRAWINGS

Figure 1:
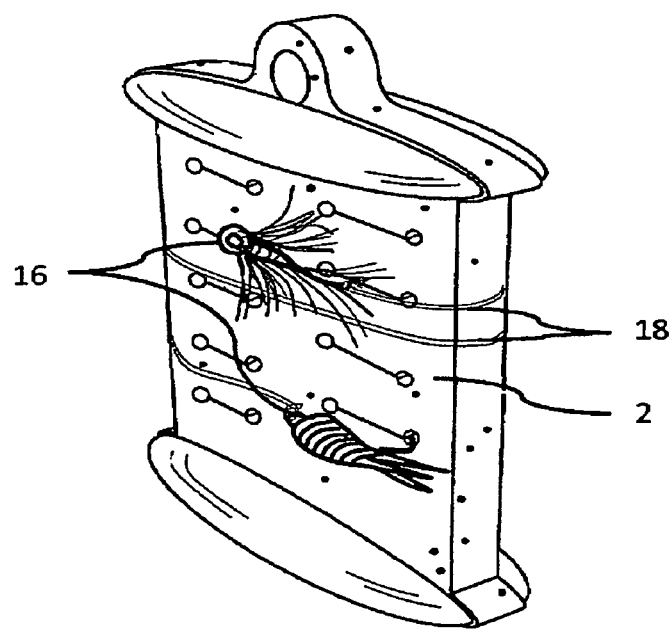

Reference Numerals 2 terminal tackle holder
4 cushioned and resilient base
6 exposed rib that extends past the base
8 triangular hook retention cutout with slit/cuts
10 attachment point
12 round hook retention cutout with slit/cuts
14 vertical side rib
16 rib
18 artificial flies
20 fishing line
22 notch with slit/cuts

DETAILED DESCRIPTION OF THE PREFERRED EMBODIMENT(S)

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

With reference to the drawings, in general, and to FIG. 1 in particular, a multi-featured double-sided terminal tackle holding apparatus #2 embodying the principles of the present invention is generally depicted. The #2 terminal tackle holder is shown with #18 artificial flies inserted into the #12 round hook retention cutouts with slit/cuts which are located in the #4 cushioned and resilient base between the #6 exposed ribs that extends past the base. Further illustrating how the #20 fishing line that connects the two #18 artificial flies together is wrapped around the #4 cushioned and resilient base material.

Figure 2A:
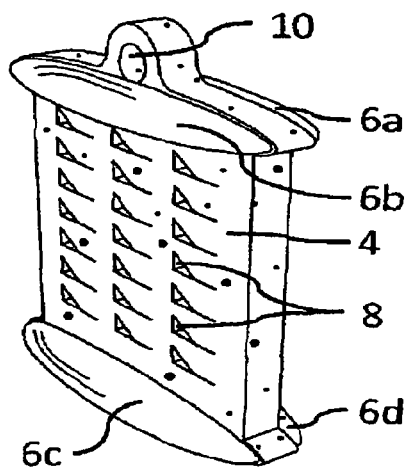
FIG. 2B is a rear perspective view of the invention illustrating the ribs on the backside of the base, and how the triangular hook retention cutouts with slit/cuts are cut all the way through the base.
FIG. 2C is a front elevation view, illustrating the general layout of the holder and further illustrating how the ribs and the base material both protrude past the sides of the base.
FIG. 2D is a bottom plan view of the holder further illustrating the rib and base layout.

Referring to FIG. 2A a perspective front view of the terminal tackle holder in one preferred embodiment; the holder is symmetrical. The #4 cushioned and resilient base is a flat rectangular piece of EVA foam. Four #6 exposed ribs extend past the sides of the #4 the cushioned and resilient base and located at the top and bottom of the #4 cushioned and resilient base. The #6 exposed ribs and the #4 cushioned and resilient base extend outward from both the sides of the #4 base. Further illustrating #8 triangular hook retention cutouts with slit/cuts and #10 attachment point.

Figure 2B:
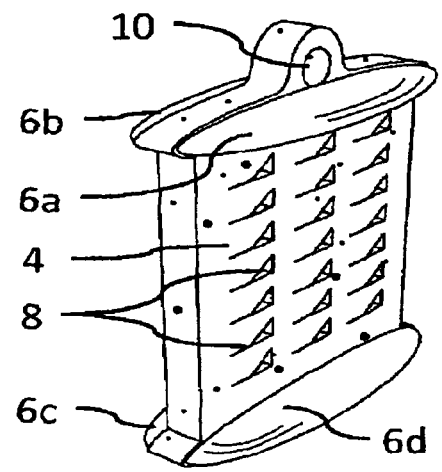

FIG. 2B a rear elevation view of the preferred embodiment of FIG. 2A shows in how the front and the back of the #2 terminal tackle holder are symmetrical.

Figure 2C:
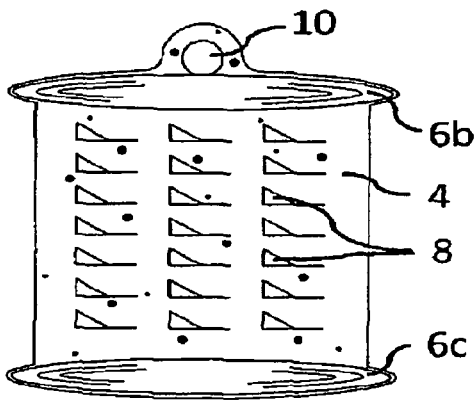

FIG. 2C a front elevation view of the preferred embodiment of FIG. 2A shows in more detail the placement of the main features.

Figure 2D:
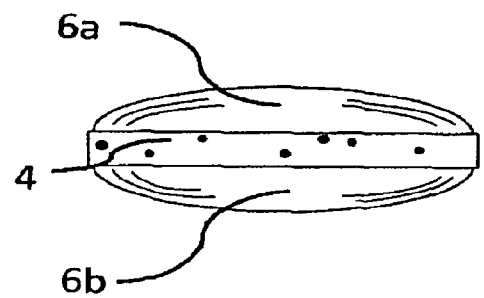

FIG. 2D is a bottom plan view of the preferred embodiment of FIG. 2A shows in more detail how the #6c and #6d ribs sandwich the #4 cushioned and resilient base.

Figure 3:
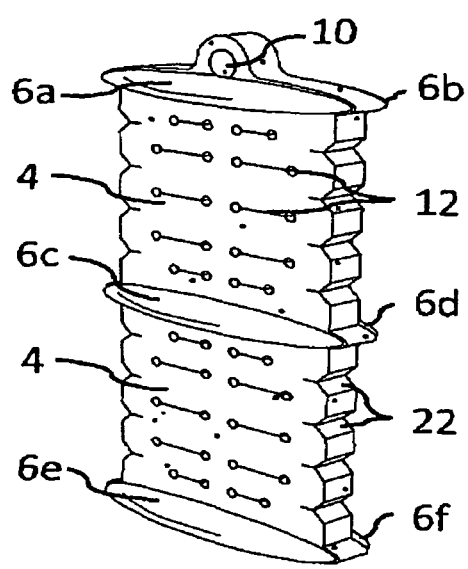
FIG. 3 is a perspective view of another embodiment of the holder illustrating a center pair of ribs on an elongated rectangular shaped base; also showing slit/cuts with round cutouts on the base face located between the ribs, and further illustrating the notches with slit/cuts along the two sides of the base.

Referring to FIG. 3 a perspective front view of the terminal tackle holder in one preferred embodiment illustrates an alternative shape of the device. The #4 cushioned and resilient base has an elongated rectangular shape, and further comprises an additional pair of #6c and #6d exposed ribs that extend beyond the base. Also illustrating #12 round hook retention cutouts with slit/cuts within the #4 cushioned and resilient base, and #22 notches with slit/cuts located along both sides of the #4 base.

Figure 4:
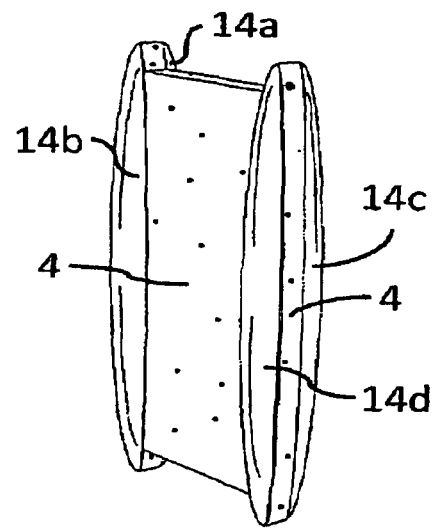
FIG. 4 is a perspective view of another embodiment illustrating the holder in it's most basic form, further illustrating the base in an elongated form, having elongated ribs running vertically down both sides of the base.

Referring to FIG. 4 a perspective front view of the terminal tackle holder in one preferred embodiment, illustrates an alternative shape of the device where the #4 cushioned and resilient base is an elongated rectangle with #14 vertical side ribs located on both sides of the #4 cushioned and resilient base. Further illustrating the #2 terminal tackle holder without an #10 attachment point.

Figure 5:
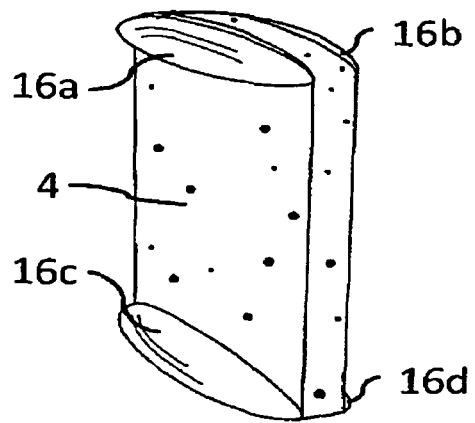
FIG. 5 is a perspective view of another embodiment illustrating with the holder in its most basic form, having ribs that are the same length as the width of the base.

Referring to FIG. 5 a perspective front view of the terminal tackle holder in one preferred embodiment illustrating another alternative shape of the terminal tackle holder wherein the #16 ribs don't extend past the sides of the #4 base. Further illustrating the #2 terminal tackle holder without an #10 attachment point.

One or more of the various advantageous features of the present invention may be incorporated into the terminal tackle holder for beneficial results. These features provide benefit individually as well as collectively to produce a wearable fishing rod holder.

The foregoing description should be considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim is:

1. A double-sided terminal tackle holder for securing fishing line and fishing hooks, comprising: a three-dimensional, generally flat and generally rectangular shaped base; said base having a first face, a second face, a first side, a second side, a third side, and a fourth side; said base comprised of cushioned and resilient material; wherein said base further comprises four, three-dimensional exposed and elongated ribs, each of said ribs having a first face, a second face, a first side, a second side, a first end, and a second end; wherein one of the sides of said first rib is statically affixed to said base's first face, adjacent and parallel to said base's first side; wherein one of the sides of said second rib is statically affixed to said base's first face, adjacent to said base's third side, and being substantially parallel in relation to said first rib; wherein one of the sides of said third rib is statically affixed to said base's second face, adjacent and parallel to said first side of said base; wherein one of the sides of said fourth rib is statically affixed to said base's second face, adjacent to said base's third side, being substantially parallel in relation to said third rib; wherein said third and fourth ribs are positioned on said second face in direct relation to said first and second ribs positioned on said first face; such that said first and second base faces have said first and second ribs, and said third and fourth ribs, respectively, attached in a parallel relationship; said first and second ribs, and said third and fourth ribs, each being substantially separated from one another creating an open space therebetween where fishing line and hooks are secured; wherein all of said ribs are orientated in the same direction; wherein each of said ribs extend substantially outward from the surface of said first and second faces of said base, in order to protect terminal tackle; wherein said base comprises a means for receiving and releasably holding fishing hooks; wherein said means for receiving and releasably holding said fishing hooks is comprised of slits, each slit of said slits having a first slit face and a second slit faces; said slits being indexed within said first face and said second face of said base and located in said open space between said first and second ribs, and said third and fourth ribs; such that fishing hooks are insertable into said slits between the first and second slit faces where the cushioned and resilient material compresses upon said fishing hooks to secure them.

2. Terminal tackle holder as claimed in claim 1 wherein the base is further comprised of notches within the second and fourth sides of the base in order to receive fishing line in a wrapped relation; wherein each of said notches being generally "V" shaped, defined by an open end, a first notch face and a second notch face; wherein said second and fourth sides of the base further comprise notch slits, wherein each of said notches is connected at one end to at least one notch slit of said notch slits at the bottom of the "V" where the first notch face and the second notch face meet, which is opposite the open end; such that when fishing line is wrapped around said base it is insertable into said notches, where said notches keep fishing line organized into groups and from becoming tangled; the "V" shape of said notches also helps to guide fishing line into said notch slits; said fishing line is further insertable into said notch slits in order to secure fishing line ends, where the cushioned and resilient material compresses upon said fishing line to secure it.

3. Terminal tackle holder as claimed in claim 1 further comprised of an attachment point for attaching said terminal tackle holder to a person.

4. Terminal tackle holder as claimed in claim 1 wherein said base is further comprised of a fifth rib and a sixth rib; said fifth rib being statically attached to said first face of said base, being in a parallel relation to, and located generally central between said first rib and said second rib; said sixth rib being statically attached to said second face of said base, being in a parallel relation to, and located generally central between said third rib and said fourth rib; wherein said sixth rib is positioned in direct relation to said fifth rib;

such that the fifth and sixth ribs further help protect terminal tackle.

5. Terminal tackle holder as claimed in claim 1 wherein at least one of the said first, second, third and fourth ribs extends beyond one of said first, second, third and fourth sides of said base.

6. Terminal tackle holder as claimed in claim 1 wherein each of said first, second, third and fourth ribs are further comprised of durable materials.

7. Terminal tackle holder as claimed in claim 1 wherein said means for receiving and releasably holding fishing hooks further comprises cutouts within said first face and said second face of said base, located in said open space between said first and second ribs, and said third and fourth ribs, respectively, at terminal ends of said slits; such that fishing hooks are insertable into said cutouts where points of said fishing hooks can be directly inserted into said cushioned and resilient base material.

* * * * *